United States Patent [19]
Van Zee et al.

[11] Patent Number: 5,097,797
[45] Date of Patent: Mar. 24, 1992

[54] POULTRY FEEDER

[75] Inventors: Larry J. Van Zee, Beacon, Iowa; Thomas W. Arndt, Belleville, Mich.; Frank E. Hayward, Fairfield, Iowa; Ben O. Hall, Oskaloosa, Iowa; Millard N. Williams, Oskaloosa, Iowa

[73] Assignee: Intraco, Inc., Oskaloosa, Iowa

[21] Appl. No.: 426,078

[22] Filed: Oct. 23, 1989

[51] Int. Cl.$^5$ .............................................. A01K 39/01
[52] U.S. Cl. .................................................. 119/57.4
[58] Field of Search ............. 119/52.4, 53, 57.2, 119/57.3, 57.4, 51.11, 63, 72, 74

[56] References Cited

U.S. PATENT DOCUMENTS

| | | | |
|---|---|---|---|
| 2,505,396 | 4/1950 | Grindstaff | 119/52.4 |
| 2,571,004 | 10/1951 | Bacon | 119/52.4 |
| 2,808,029 | 10/1957 | Geerlings | 119/52.4 |
| 3,205,860 | 9/1965 | Moore | 119/52.4 |
| 3,389,689 | 6/1968 | Van Huis | 119/57.4 |
| 3,505,977 | 4/1970 | Mancini | 119/63 X |
| 4,216,742 | 8/1980 | Kirchhofer | 119/57.4 X |
| 4,476,811 | 10/1984 | Swartzendruber | 119/57.4 |
| 4,516,533 | 5/1985 | Mallinson | 119/72 |
| 4,552,095 | 11/1985 | Segalla | 119/57.4 X |

FOREIGN PATENT DOCUMENTS 0196376 4/1923 United Kingdom .................. 119/63

*Primary Examiner*—Robert P. Swiatek
*Assistant Examiner*—Todd E. Manahan
*Attorney, Agent, or Firm*—Kent A. Herink; Brian J. Laurenzo

[57] ABSTRACT

A poultry feeder releasably attachable to a feed conveyor and adjustable to feed poultry on either an ad libitum basis or a restricted feed basis. A segmented cage is mounted on an upright barrel member that is releasably attached to the feed conveyor. Feed from the conveyor passes through the barrel member to a feed pan suspended beneath the barrel member by the segmented case. In the restricted feeding mode, the barrel member can store feed for release into the feed pan as feed is consumed by the poultry. In the overfill or ad libitum mode, a control member directs feed outside of the barrel member into the feed pan to more completely fill the pan for improved access to young poultry.

19 Claims, 4 Drawing Sheets

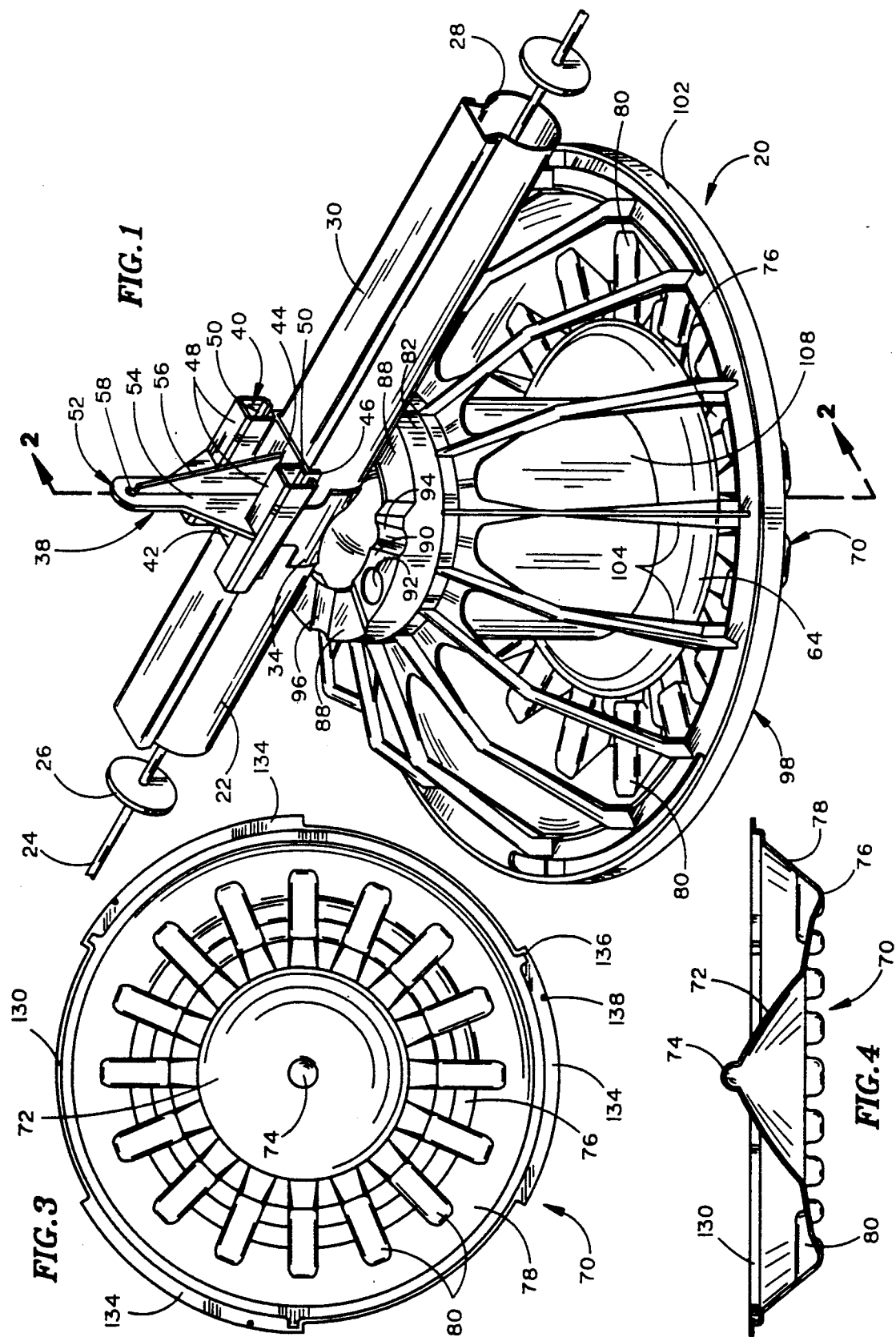

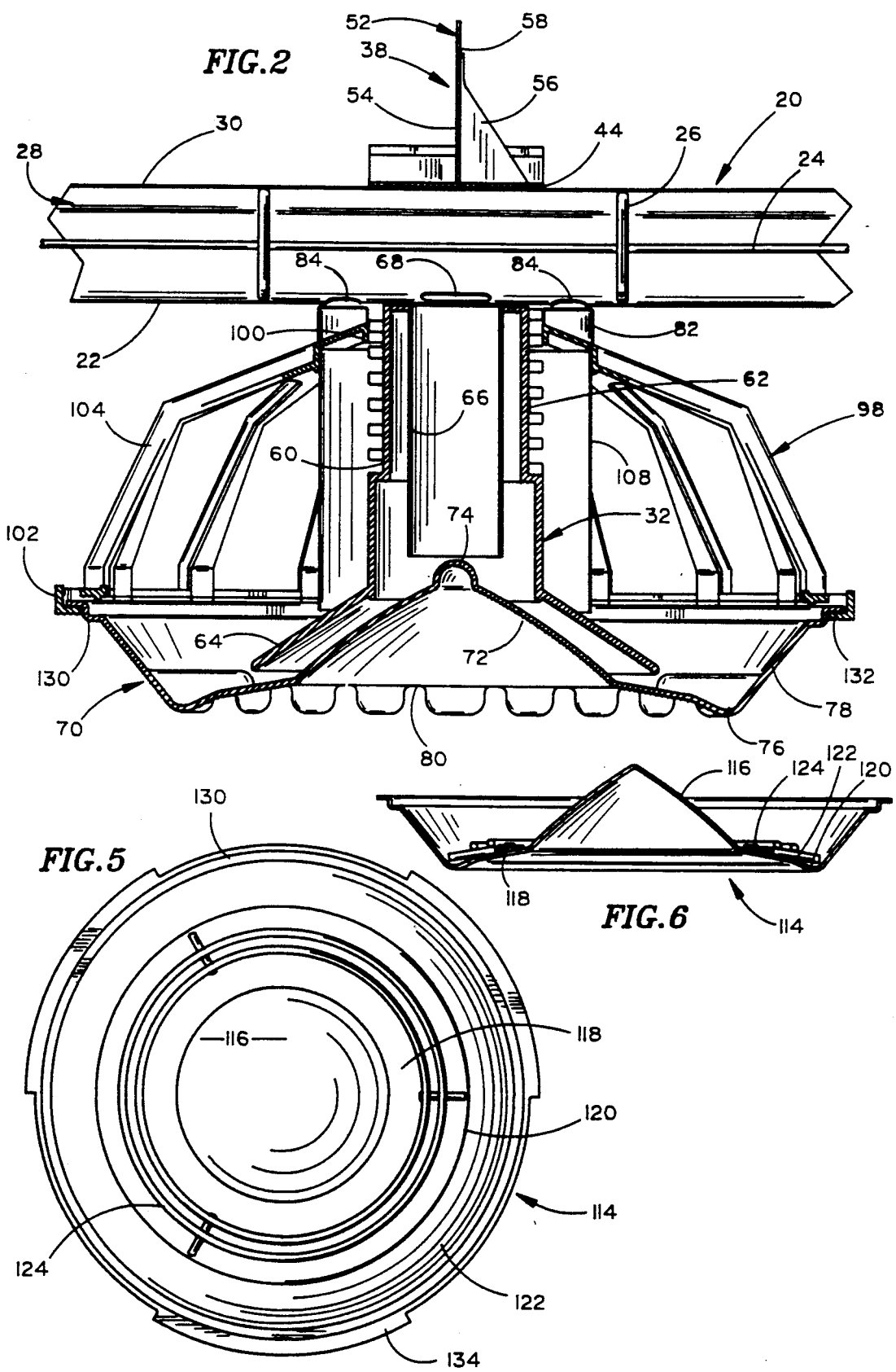

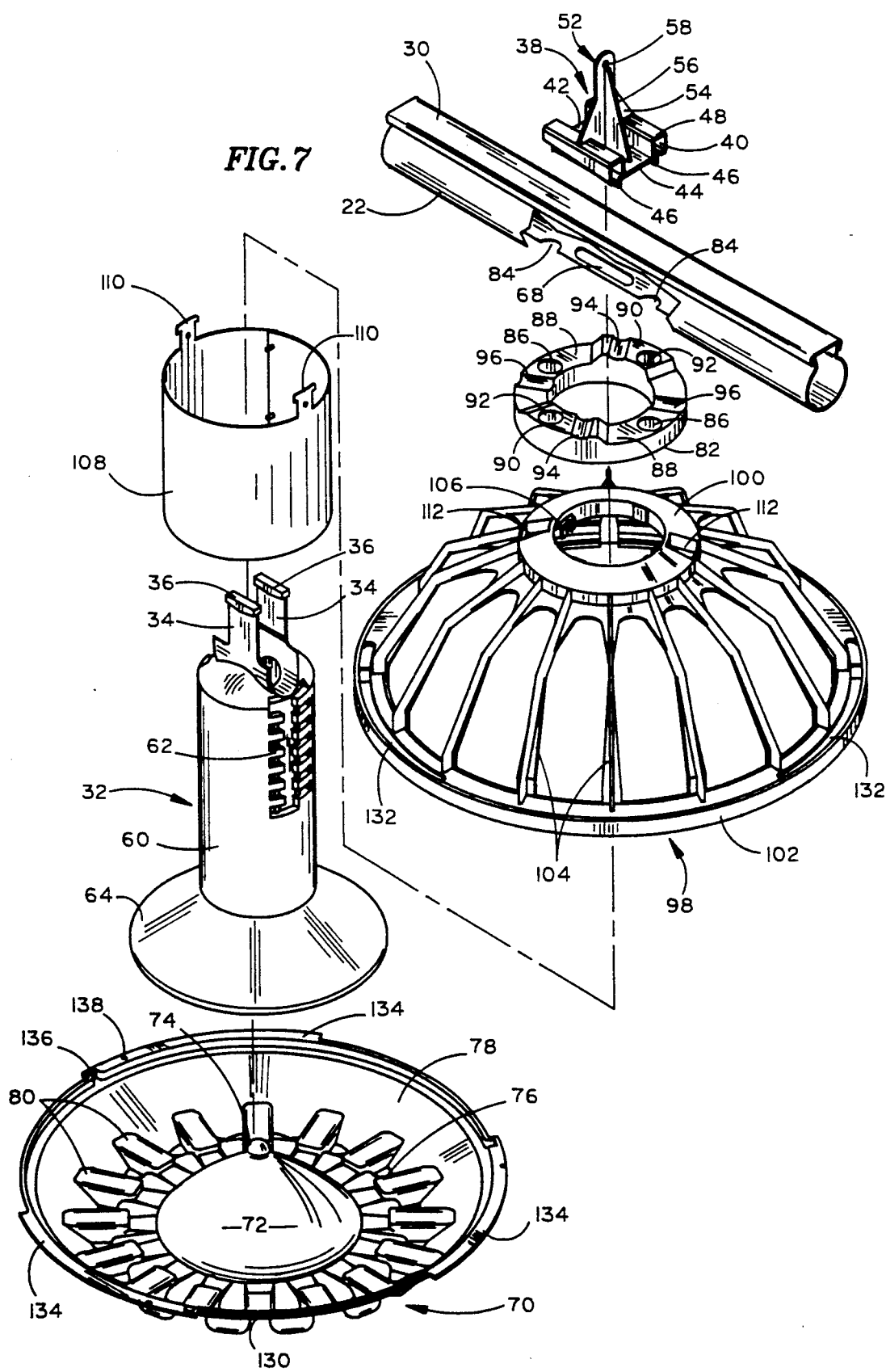

POULTRY FEEDER

BACKGROUND OF THE INVENTION

This invention relates generally to poultry feeders and, more particularly, to poultry feeders adjustable to feed younger poultry on an ad libitum basis and somewhat older poultry on a restricted amount basis.

Modern feeding operations for chickens may house more than one hundred thousand individuals in a common or intermixed area. Automated feeding systems are used which employ conveyance means for delivering feed to a plurality of feeders. Each of the feeders typically serve approximately ten to one hundred individuals.

Feeding regimens provide an unlimited amount of feed to newly hatched chicks for rapid early growth and development. As the chicks mature, the feeding regimen may be changed, particularly if the chickens being raised are intended for egg production, to provide only a restricted amount of feed at intervals spaced by many hours. The chickens are usually quite hungry and anxious to eat when feed is next made available. As a result, when the conveyance machinery starts, the noise associated therewith alerts the chickens of the delivery of feed whereupon they scurry to the feeders and compete for feeding space and the limited amount of feed. Conventional feeders have limitations which make the interval between feedings greater than 24 hours in typical applications.

It is, accordingly, important to provide a sufficient number of feeders that efficiently control the delivery of feed to supply simultaneous feeding space for all individuals in the housing facility. The feeders should be adaptable to provide unlimited feed for younger chicks and restricted regimens for more mature chickens without requiring replacement of the feeders as the chickens mature. Feed wastage should also be limited for efficiency in both the ad libitum and restricted modes of feeding.

SUMMARY OF THE INVENTION

The invention consists of a poultry feeder for use in poultry housing facilities having conveyor mechanisms for distributing feed to a plurality of such feeders located throughout the housing facility. The feeder consists primarily of a central barrel member on which is carried a circular segmented cage to the bottom of which a feed pan is attached and supported in adjustable relation to the barrel member. The barrel member is releasably attached to a conveyor tube of the feed conveyance mechanism. A first, central opening in the tube permits feed to fall into the central barrel member for distribution around the feed pan. The cage is divided into a plurality of open segments that are evenly distributed about the periphery of the cage above the feed pan. Poultry using the feeder gain access to feed in the feed pan through the openings in the cage.

A control member is carried on the upper portion of the barrel member closely adjacent the conveyor tube and is pivotable between an open position and a closed position. In the open position of the overfill member, feed is permitted to flow out of a pair of holes in the underside of the conveyor tube to either side of the first, central feed opening and in the closed position, the control member blocks the pair of holes. For ad libitum feeding, feed from the pair of holes flows outside the barrel member and inside a sleeve which encircles the central part of the barrel member below the control member, thereby forming a feed reservoir. The feed then flows into the feed pan through a gap between the lower edge of the sleeve and a frustum-shaped lower portion of the barrel member. The feed pan is of a shape to channel feed to a position easily accessible to the poultry and which will conserve and return feed displaced or dropped by the poultry during feeding to the accessible feeding region.

For restricted feeding, the control member is pivoted to close the two side holes and feed flows only into the central opening of the barrel member for distribution into the feed pan. The interior of the barrel member can be filled with the feed which will then be released into the pan as feed in the pan is depleted by feeding of the poultry.

The feed pans may be segmented in position and number roughly corresponding to the openings in the cage to further reduce the amount of feed in the restricted feeding mode. With nonsegmented feeding pans, a floating ring or rings may be used inside the feed pan which will reduce the area of exposed feed. The reduced area will thereby reduce, in the restricted feeding mode, the rate of feed consumption to facilitate access to the limited amount of feed to more individuals and to prevent feeders from being depleted of feed before the conveyance means has had time to fill all of the feeders in the poultry housing facility.

BRIEF DESCRIPTION OF THE DRAWINGS

FIG. 1 is a perspective view of a poultry feeder shown attached to a cable conveyor tube;

FIG. 2 is a cross-sectional view of the feeder taken along line 2—2 of FIG. 1;

FIG. 3 is a top plan view of a segmented feed pan for use with the poultry feeder;

FIG. 4 is a cross-sectional view of the feed pan illustrated in FIG. 3;

FIG. 5 is a top plan view of a nonsegmented feed pan and floating ring associated therewith;

FIG. 6 is a cross-sectional view of the feed pan and floating ring of FIG. 5;

FIG. 7 is an exploded perspective view of the poultry feeder and a section of the conveyor tube;

DETAILED DESCRIPTION OF A PREFERRED EMBODIMENT

Figure 8:
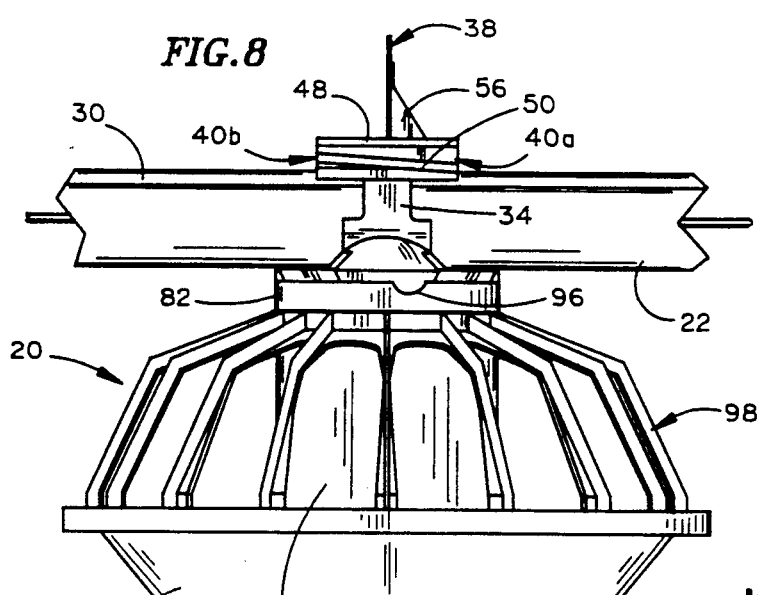
FIG. 8 is a side elevational view of the poultry feeder in a first overfill position therefor.
Figure 9:
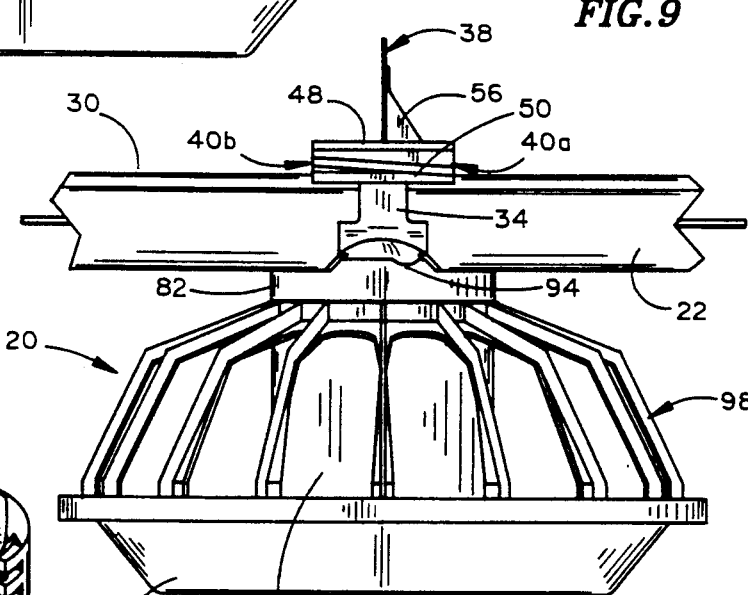
FIG. 9 is a side elevational view of the poultry feeder in a second overfill position therefor.

Referring to the drawings, illustrated in FIG. 1, generally at 20, is a poultry feeder attached to a conveyor tube 22 within which a conveyor cable 24 and associated conveyor disks 26 are moved to convey feed through the conveyor tube 22 and thereby supply feed to the feeder 20. Access to the interior of the conveyor tube 22 is available through a longitudinal opening 28 on the upper side thereof which is closed during normal use by a cover 30. The conveyor tube 22 is typically suspended from above and is height adjustable relative to the floor of the housing facility to accommodate the change in height of the poultry as they mature.

A barrel member 32, which is best illustrated in FIG. 7, includes an upper portion consisting of a pair of upstanding mounting ears 34 each of which terminates in a mounting block 36. The mounting ears 34 are spaced apart by a distance to accommodate therebetween the conveyor tube 22 (FIGS. 1, 2, 8 and 9). The barrel member 32 is saddle-shaped in the area between the two ears 34 so that the barrel member 32 is in close contact engagement with the conveyor tube 22 when mounted thereto.

The barrel member 32 is retained on the conveyor tube 22 by a sliding lock member 38 (FIGS. 1, 2, 7, 8 and 9) which includes a pair of tapered channels 40 (FIG. 1) that run parallel to each other on either side of the lock member 38 and immediately above a floor section 42 thereof. The floor section 42 is comprised of a flat web portion 44 and two opposite leg sections 46 that extend downwardly on either side of the web portion 44. The channels 40 are generally rectangular-shaped in transverse cross section and include an upper wall 48 that is parallel to the web portion 44 of the floor section 42 and a lower wall 50 that slopes upwardly toward the upper wall 48 from one end 40a of the channels 40 to an opposite end 40b such that the distance between the upper wall 48 and the lower wall 50 decreases from the one end 40a to the other end 40b (FIGS. 1, 7, 8 and 9). The inner edge of the lower wall 50 is spaced from the floor section 42 to form a longitudinal groove or opening in the channels 40 (FIGS. 1 and 7).

The sliding lock member 38 is completed by a stand-off 52 which is substantially T-shaped in transverse cross-section, having a web portion 54 extended between the channels 40 and a leg portion 56 attached to the floor section 42 and extended longitudinally of the sliding lock member 38. The free end portion of the web portion 54 includes an opening 58 through which a wire carrying a voltage for delivery of an electric shock may be extended to prevent the poultry from standing atop the tube 22.

Figure 10:
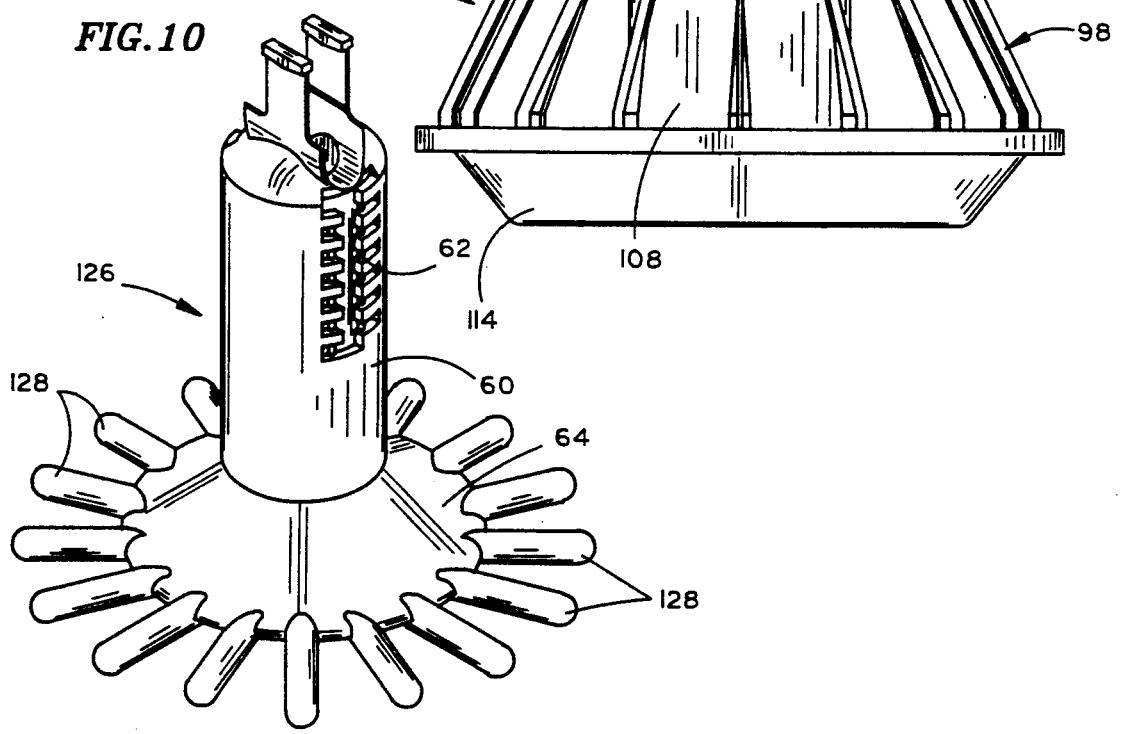
FIG. 10 is a perspective view of an alternative barrel member of the poultry feeder.

To attach the poultry feeder 20 to the conveyor tube 22, the conveyor tube 22 is received between the two ears 34 and moved into contact engagement with the saddle-shaped area therebetween. The sliding lock member 38 is placed with the web portion 44 of the floor section 42 atop the cover 30, with the leg portions 46 of the floor section 42 to either side of the cover 30, and so that the larger end 40a of each of the channels 40 is adjacent the mounting blocks 36. The sliding lock member 38 is slidably moved longitudinally of the conveyor tube 22 toward the mounting blocks 36 which are received inside the channels 40, the ears 34 extending through the gap between the lower wall 50 and the floor section 42. The mounting blocks 36 are thickest at their longitudinal center and taper toward each end (FIGS. 7 and 10). Accordingly, the mounting blocks 36 will in some region approximately intermediate of the ends 40a and 40b wedge inside the channels 40. The sloping lower wall 50 of the channels 40 will further act to wedge the web portion 44 of the floor section 42 forcefully against the cover 30 so as to secure the barrel member 32 to the conveyor tube 22.

Referring again to FIGS. 2, 7 and 10, a central portion 60 of the barrel member 32 is substantially cylindrical shaped. A plurality of spaced retaining notches 62 are inset within the outer periphery and arranged longitudinally of the central portion 60 in two parallel rows. A second set of notches (not shown) are located diametrically opposite of the first set of notches 62. As will be explained more fully below, the retaining notches 62 will permit adjustment of the barrel member 32 relative to certain of the other parts of the feeder 20.

The lower portion of the barrel member 32 consists of a frustum-shaped deflector 64 that flares downwardly and outwardly from the lower end of the central portion 60. Extending axially downwardly from the saddle-shaped area of the barrel member 32 and inside the central portion 60 is a reduced cylinder or silo 66 (FIG. 2). The silo 66 is open at either end, with the top end in communication with the interior of the conveyor tube 22 via a first or central opening 68 in the conveyor tube 22. The silo 66 flares slightly from top to bottom such that the bottom diameter thereof is larger than the top to facilitate the flow of feed from the silo 66. Feed being conveyed inside the tube 22 will thus fall through opening 68 and into the silo 66.

A segmented feed pan 70 (FIGS. 1–4, and 7) of the poultry feeder 20 has a floor of a shape to enhance the feed efficiency of the feeder 20. As best illustrated in FIGS. 2 and 4, the central portion of the feed pan 70 is a cone 72 that slopes radially outward from a peak 74 located on the center of the feed pan 70. Feed from the barrel member 32 will, accordingly, be directed radially outwardly by the cone 72 toward the periphery of the feed pan 70 into an accessible feeding region 76 which is the lowest region of the feed pan 70. An outer side wall 78 of the segmented pan 70 slopes upwardly and outwardly from the outer periphery of the feeding region 76 to the outer periphery of the pan 70. Feed contacting the side wall 78 will, accordingly, tend to be returned to the feeding region 76. It has been found advantageous to slope the side wall 78 a steepness sufficient to prevent feed from being forced up the side wall 78 as feed enters the feeding region 76 from the cone 72.

A plurality of segmenting ridges 80 extend radially from the cone 72 to the side wall 78. Because the segmenting ridges 80 are above the level of the feeding region 76 and have sloping side walls, feed will be directed into the portions of the feeding region 76 that are between the segmenting ridges 80. Accordingly, if a limited amount of feed is present in the segmented pan 70, it will tend to collect in the segments of the feeding region 76 located between the ridges 80.

A control valve member 82 (FIGS. 1 and 7) of an annular shape is received about the central portion 60 of the barrel member 32 closely adjacent to the conveyor tube 22. The control member 82 has a number of features on its upwardly facing surface that control the mode of operation of the feeder 20. Located on either side of the central opening 68 of the conveyor tube 22 are a pair of overfill openings 84 that are spaced from the central opening 68 by a distance to place them immediately outside of the radial extension of the central portion 60 of the barrel member 32 when the feeder 20 is mounted to the conveyor tube 22 (FIG. 2). The upper surface of the control member 82 includes a pair of diametrically opposite openings 86 on a lower portion 88 thereof. The control member 82 also includes on its upper face a pair of raised portions 90 with a pair of diametrically opposed openings 92 therein. The raised section 90 and the lowered section 88 also include a pair of diametrically opposed grooves 94 and 96, respectively, that are of a shape to correspond to the lower surface of the conveyor tube 22. As will be described in more detail below, the control member 82 is used to control the flow of feed into the feeder 20 from the overfill openings 84.

Also received about the central portion 60 of the barrel member 32 below the control member 82 is a segmented basket or cage 98. The cage 98 consists of an upper retaining ring 100 and a lower pan ring 102 that are concentric and connected together by a plurality of ribs 104 that extend radially from the retaining ring 100 outwardly and downwardly to the pan ring 102. The cage 98 acts to prevent the poultry from crowding too close to the feeder 20, allowing them to insert their heads between the ribs 104 to feed but preventing more mature poultry from climbing into the feed pan 70. This will permit a larger number of individuals to feed from each feeder 20.

In assembly of the feeder 20, the retaining ring 100 is received about the central portion 60 of the barrel member 32. A pair of diametrically opposed tooth members 106 are located on the inner periphery of the retaining ring 100. The tooth members 106 coact with the notches 62 of the barrel member 32 to adjustably and releasably secure the cage 98 on the barrel member 32 at a plurality of vertically spaced positions.

A substantially cylindrical overfill sleeve 108 is attached to the retaining ring 100 by means of a pair of tabs 110 that are received and releasably held within a pair of openings 112 in the retaining ring 100. The sleeve 108, accordingly, extends downwardly from the retaining ring 100 encircling the central portion 60 of the barrel member 32. The sleeve 108 is of a length sufficient to bring the lower end portion thereof sufficiently near to the frustum-shaped deflector 64 of the barrel member 32 such that feed will flow out of the sleeve 108 and into the feed pan 70. When feed is present in the feed pan 70, however, in sufficient quantities as to rise above the lower end of the sleeve 108, feed between the sleeve 108 and the barrel member 32 will be stored until such time as the level of feed in the pan has been lowered so as to permit the resumption of flow. The sleeve 108, in combination with the barrel member 32, accordingly acts as a feed reservoir to permit a greater amount of feed to be held in the feeder 20 although not distributed throughout the feed pan 70. In a similar manner to the silo 66, the sleeve 108 flares slightly from top to bottom. It has been found that this facilitates the flow of feed from the sleeve 108 into the pan 70 and acts to prevent bridging or blockage of the feed inside the sleeve 108 and silo 66.

In assembly on the feeder 20, the control member 82 rests atop the retaining ring 100 of the cage 98. Accordingly, the control member 82 is height adjustable together with the adjustment of the cage 98 within the notches 62 of the barrel member 32. When the lower section 88 of the control member 82 is adjacent to the conveyor tube 22, the cage 98 is in its relatively highest position on the barrel member 32. In this position, the control member 82 can be pivoted such that the grooves 96 of the lower section 88 are in contact engagement with the conveyor tube 22 so that the overfill openings 84 are closed. In this position, feed being conveyed inside the conveyor tube 22 will pass only through the central opening 68 and hence into the silo 66. Alternatively, the control member 82 can be pivoted to align the openings 86 of the lower section 88 with the openings 84 in the conveyor tube 22. Now, feed being conveyed in the conveyor tube 22 will fall through the aligned openings 84 and 86 as well as the central opening 68. The aligned holes 84 and 86 are also aligned above the openings 112 in the retaining ring 100 such that feed falling therethrough will enter the region between the sleeve 108 and the barrel member 32.

If the retaining ring 100 of the cage 98 is moved to the next lower notch of the barrel member 32, the grooves 94 and the openings 92 in the upper section 90 of the control member 82 will function as described above with respect to the corresponding parts 96 and 86 to regulate the flow of feed through the overfill openings 84 in the conveyor tube 22. The only difference in function of the feeder 20 between the upper and lower positions of the overfill member 82 and cage 98 is to increase the spacing between the frustum-shaped deflector 64 of the barrel member 32 and the cone 72 of the feed pan 70 (FIG. 2). This adjustment is desirable to accommodate feeds having different flow characteristics. For an easy-flowing feed having a relatively shallow angle of repose, the lower notches would be used (FIG. 9) to place the cone 72 closer to the frustum-shaped deflector 64 so that the feed would not easily flow out of the barrel member 32 into the pan 70, possibly filling the pan. If the feed flows less easily, a greater amount of space between the cone 72 and the frustum-shaped deflector 64 will be required to ensure that feed inside the barrel member 32 will flow as it is depleted from the pan 70, so the upper notches would be used (FIG. 8).

An alternative nonsegmented pan 114 is illustrated in FIGS. 5 and 6. Similar to the segmented feed pan 70, the nonsegmented feed pan 114 includes a central cone 116 which will serve to direct feed radially outwardly in the pan 114 from the barrel member 32. Radially outwardly of the cone 116 is an annular shelf region 118 of a slope somewhat less steep than that of the cone 116. The shelf region 118 leads to a circular feeding groove or trench 120 adjacent a steeply sloped outside wall 122 that will return to the feeding trench 120 any feed that happens to fall thereon as a result of the feeding activity of the poultry. The trench 120, moreover, has a vertical outer wall portion which will serve to stop the flow of feed from the cone 116 and thereby help to retain feed in the trench 120. Feed introduced centrally of the pan 114 will, accordingly, be directed to the lowest part of the pan, the feeding trench 120, as will feed which is scattered about the pan by the poultry.

When feeding a limited or restricted amount of feed, it is advantageous to lengthen the time interval over which feed is accessible to the poultry so that each individual has an enhanced opportunity to compete for the limited amount of feed. To reduce the rate of flow of feed down the cone 116 a floating ring member 124 is added to the pan 114 and rests on the shelf region 118. The floating ring member 124 is a low, incomplete obstruction to the flow of feed and is movable in response to the feeding actions of the poultry. Thus feed will be permitted to move from the region of the cone 116 to the feeding trench 120 but more slowly than in the absence of the ring member 124 and only intermittently. Movement or jostling of the ring member 124 by the poultry will further increase the feeding interval by momentarily unsettling the feeding poultry by its movement and noise. Feeding activity will be temporarily interrupted which will serve to decrease the rate of consumption of the restricted amount of feed and permit individuals which may have been crowded away from the feeder to gain access thereto. The ring further reduces the exposed area of feed and thereby reduces the rate of feed consumption.

As an alternative to the segmented pan 70, a modified barrel member 126 (FIG. 10) can be used with the nonsegmented feed pan 114. The modified barrel member 126 includes a plurality of fingers 128 that project radially outwardly from the outer periphery of the frustum-shaped portion 64. The modified barrel member 126, when used with the nonsegmented feed pan 114 will create feed compartments in the feeding trench 120 thereof in the regions between the fingers 128, roughly corresponding to the regions between the segments 80 of the segmented feed pan 70.

Either pan 70 or 114 (FIGS. 3–7) includes a peripheral rim 130 that works in cooperation with the lower pan ring 102 (FIGS. 1, 2 and 7) of the cage 98 to provide means for releasably attaching either of the pans 70 or 114 to the cage 98. As best illustrated in FIGS. 2 and 7, the pan ring 102 includes three inwardly projected pan ledges 132 that evenly arranged around the periphery of the cage 98. The rim 130 of the pans 70 and 114 includes three corresponding radially projected support segments 134 (FIGS. 3, 5 and 7). To attach either of the pans 70 or 114 to the cage 98, the support segments 134 are oriented to be between the pan ledges 132. The pan is then moved adjacent the cage 98 and pivoted approximately 120 degrees in the clockwise direction when viewed from the top until a stop member 136 associated with each of the support segments 134 abuts a portion of the pan ring 102. At the stop position, a retaining finger 138 which projects from each of the support segments 134 will be releasably held in a corresponding detent (not shown) therefor in the lower pan ring 102 to prevent unintentional pivoting of the pan relative to the cage by the poultry.

In the overfill mode, feed will flow into the feeder 20 through all three of the openings in the conveyor tube 22 filling the pan 70 or 114 until the feed reaches the level of the sleeve 108 (FIG. 2). Additional feed will be stored inside the silo 66 and in the region between the central portion 60 of the barrel member 32 and the sleeve 108. This additional feed will flow into the pan as feed in the pan is depleted by the feeding poultry.

In the restricted feeding mode, feed will flow only through the central opening 68 of the conveyor tube 22 and into the silo 66 for distribution in the pan. Flow to the pan will substantially cease when the level of the feed therein rises to the lower periphery of the frustum-shaped deflector 64. Additional feed will be stored in the silo 66 and will flow into the pan as feed in the pan is depleted by the feeding poultry. The feeder 20 will permit a greater number of distributed feeders to be evenly filled with a more limited amount of feed and help to ensure that each individual has access to feed so that the interval between feedings can be decreased.

The feeders are typically arranged on a conveyor system that supplies feed substantially sequentially, with feed reaching feeders earlier the closer they are to the starting point of the conveyor system. By lengthening the time required for the poultry to empty the feeders, more time is allowed for the last pans to fill before the earlier feeders are emptied and poultry feeding from the emptied feeders begin looking for other nonempty feeders.

We claim:

1. A poultry feeder for attachment to feed conveyance means, comprising:
   a. a barrel member releasably attachable to the feed conveyance means;
   b. a cage mounted on said barrel member;
   c. a feed pan supported by said cage below said barrel member vertically adjustable relative thereto and having a feeding region accessible to the feeding poultry; and
   d. a feed conduit unadjustably fixed inside of said barrel member for passing feed to said feed pan and which stores feed for extended supply to the feed pan.

2. A poultry feeder as recited in claim 1, wherein said feed pan comprises:
   a. a central upright cone substantially coaxial with said barrel member;
   b. an annular feeding region disposed outwardly from said cone, which has a substantially vertical outer wall and which includes the lowest regions of said feed pan; and
   c. an outer wall that slopes outwardly and upwardly from said feeding region.

3. A poultry feeder as recited in claim 2, further comprising a floating ring member in said pan generally between said cone and said feeding region for slowing the rate of flow of feed into said feeding region.

4. A poultry feeder as recited in claim 3, wherein said floating ring is movable by the feeding poultry.

5. A poultry feeder as recited in claim 1, wherein said barrel member comprises:
   a. a central cylindrical section including a lower end portion;
   b. a lower frustum-shaped section that slopes outwardly and downwardly from the lower end portion of said cylindrical section; and
   c. an upper section adapted for releasable attachment to the conveyance means.

6. A poultry feeder as recited in claim 5, wherein said upper section of said barrel member comprises:
   a. a pair of upwardly extended ears including an upper end portion and spaced apart to accommodate therebetween a portion of the feed conveyance means;
   b. an attachment block at the upper end portion of each of said ears including a lower surface which slopes upwardly and outwardly from a longitudinal midpoint thereof; and
   c. means slidably engagable with a portion of said lower surface of said blocks for releasably securing said barrel member to the feed conveyance means.

7. A poultry feeder as recited in claim 1, wherein said cage comprises:
   a. an upper ring member mountable on said barrel member;
   b. a lower ring member of a size substantially equal to the size of said feed pan; and
   c. a plurality of ribs extending from said upper ring member outwardly and downwardly to said lower ring member.

8. A poultry feeder as recited in claim 7, wherein said ribs separate said cage into a plurality of feeding segments through which feeding poultry gain access to said feed pan.

9. A poultry feeder as recited in claim 1, wherein said feed conduit comprises a reduced diameter substantially cylindrical member inside and spaced apart from the inner periphery of said barrel member.

10. A poultry feeder as recited in claim 9, wherein said reduced diameter member flares outwardly from top to bottom.

11. A poultry feeder as recited in claim 1, wherein said cage is mounted for vertical adjustment relative to said barrel member.

12. A poultry feeder as recited in claim 1, further comprising:
  a. a control member adjacent the conveyance means for selectively directing feed carried in the conveyance means outside of said barrel member into said feed pan.

13. A poultry feeder as recited in claim 12, wherein said control member pivots about the central axis of said feeder.

14. A poultry feeder as recited in claim 12, further comprising:
  a. an overfill sleeve spaced outside said barrel member such that feed directed outside said barrel member passes between said overfill sleeve and said barrel member.

15. A poultry feeder as recited in claim 14, wherein feed is stored for extended supply to said feed pan in the region between said overfill sleeve and said barrel member.

16. A poultry feeder as recited in claim 14, wherein said overfill sleeve flares outwardly from top to bottom.

17. A feed pan for a poultry feeder, comprising:
  a. a central upright cone;
  b. an annular feeding region disposed outwardly from said cone and including an annular depression which forms the lowest extent of the feed plan, which has a substantially vertical outer wall, is spaced outwardly a radial distance from said cone and which serves to collect and concentrate feed in the feed plan; and
  c. an outer wall that slopes outwardly and upwardly from said feeding region.

18. A feed pan as recited in claim 17, further comprising a floating ring member in said pan generally between said cone and said feeding region for slowing the ate of flow of feed into said feeding region.

19. A feed pan as recited in claim 18 wherein said floating ring is movable by the feeding poultry.

* * * * *